United States Patent [19]

Sivachenko

[11] 4,434,638

[45] Mar. 6, 1984

[54] METHOD AND APPARATUS FOR SEVERING CORRUGATED METAL PRODUCTS

[76] Inventor: Eugene W. Sivachenko, 6471 Riverside Dr., Redding, Calif. 96001

[21] Appl. No.: 403,909

[22] Filed: Jul. 30, 1982

Related U.S. Application Data

[62] Division of Ser. No. 167,942, Jul. 14, 1980, Pat. No. 4,346,576.

[51] Int. Cl.³ .............................................. B21F 11/00
[52] U.S. Cl. ...................................... 72/130; 72/177; 72/186; 72/336; 72/339; 72/379
[58] Field of Search .......................... 72/49, 176–183, 72/130, 186, 336, 339, 379

[56] References Cited

U.S. PATENT DOCUMENTS

| | | | |
|---|---|---|---|
| 1,484,600 | 2/1924 | Witte | 72/130 |
| 1,749,342 | 3/1930 | Hazen | 72/130 |
| 2,087,065 | 7/1937 | Montgomery | 72/130 |
| 2,144,572 | 1/1939 | Kentis | 72/177 |
| 2,933,122 | 4/1960 | Christman | 72/177 |
| 3,344,641 | 10/1967 | Pomory | 72/177 |
| 3,367,161 | 2/1968 | Avakian | 72/186 |
| 4,211,099 | 7/1980 | McGonigal | 72/339 |

*Primary Examiner*—Leon Gilden
*Attorney, Agent, or Firm*—Townsend and Townsend

[57] ABSTRACT

A method and apparatus is described for use in combination with a machine for corrugating a continuous strip of flat sheet material which prepares the sheet material for separation into sections after it has been corrugated. A platform is located upstream of the corrugating machine. The platform is intermittently advanced in the direction of travel and at the speed of the sheet material so that the platform is stationary relative to the sheet material. A scoring device is located on the platform. The scoring device moves across the width of the sheet material as the platform moves with the sheet material to form a spanwise weak point in the material. After the material passes through the corrugating machine, it can readily be separated into sections at the weak points formed in the material by the scoring device. Depth of scoring can be varied also so that substantial/total separation can also occur within the corrugator though it would not separate the flat strip before it entered the corrugator.

14 Claims, 19 Drawing Figures

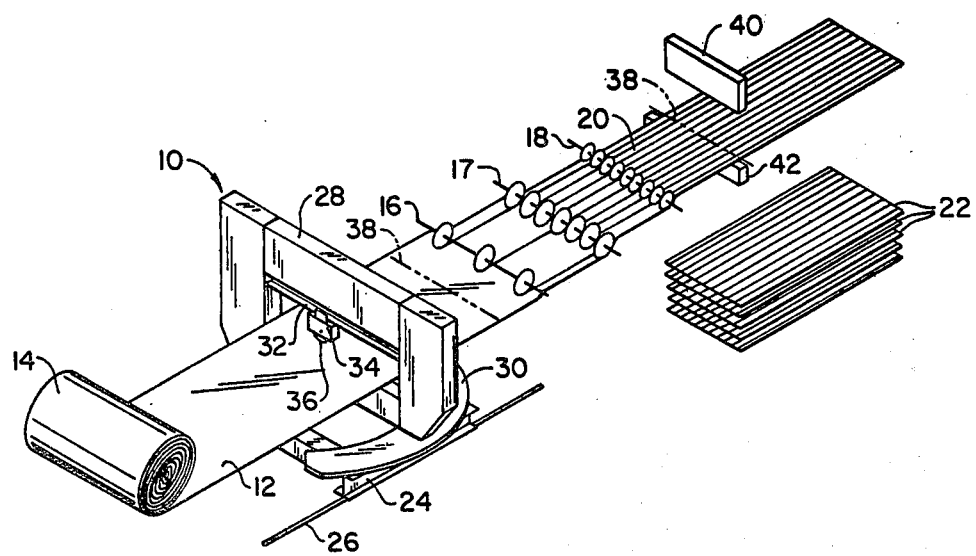
FIG.__1.
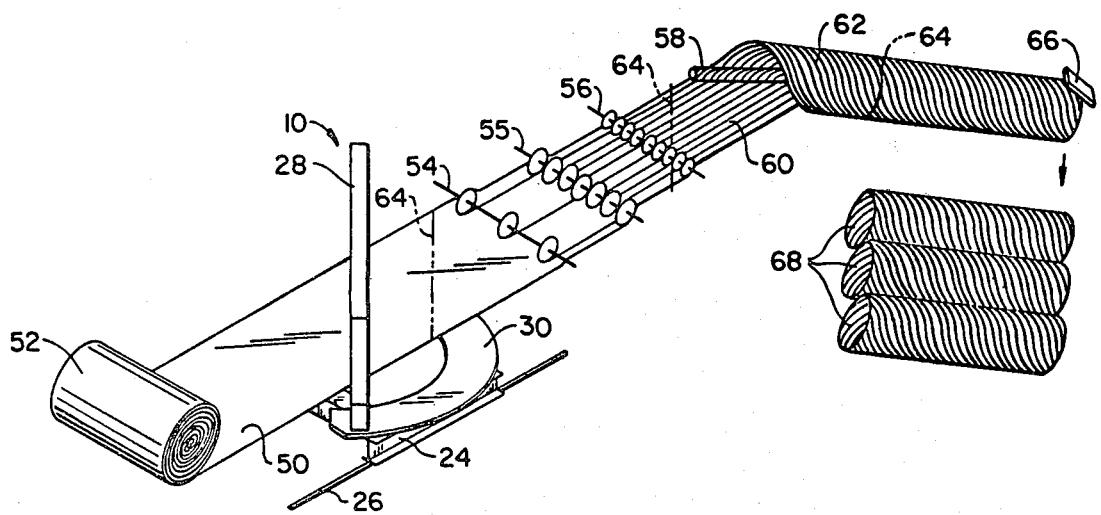
FIG.__2.

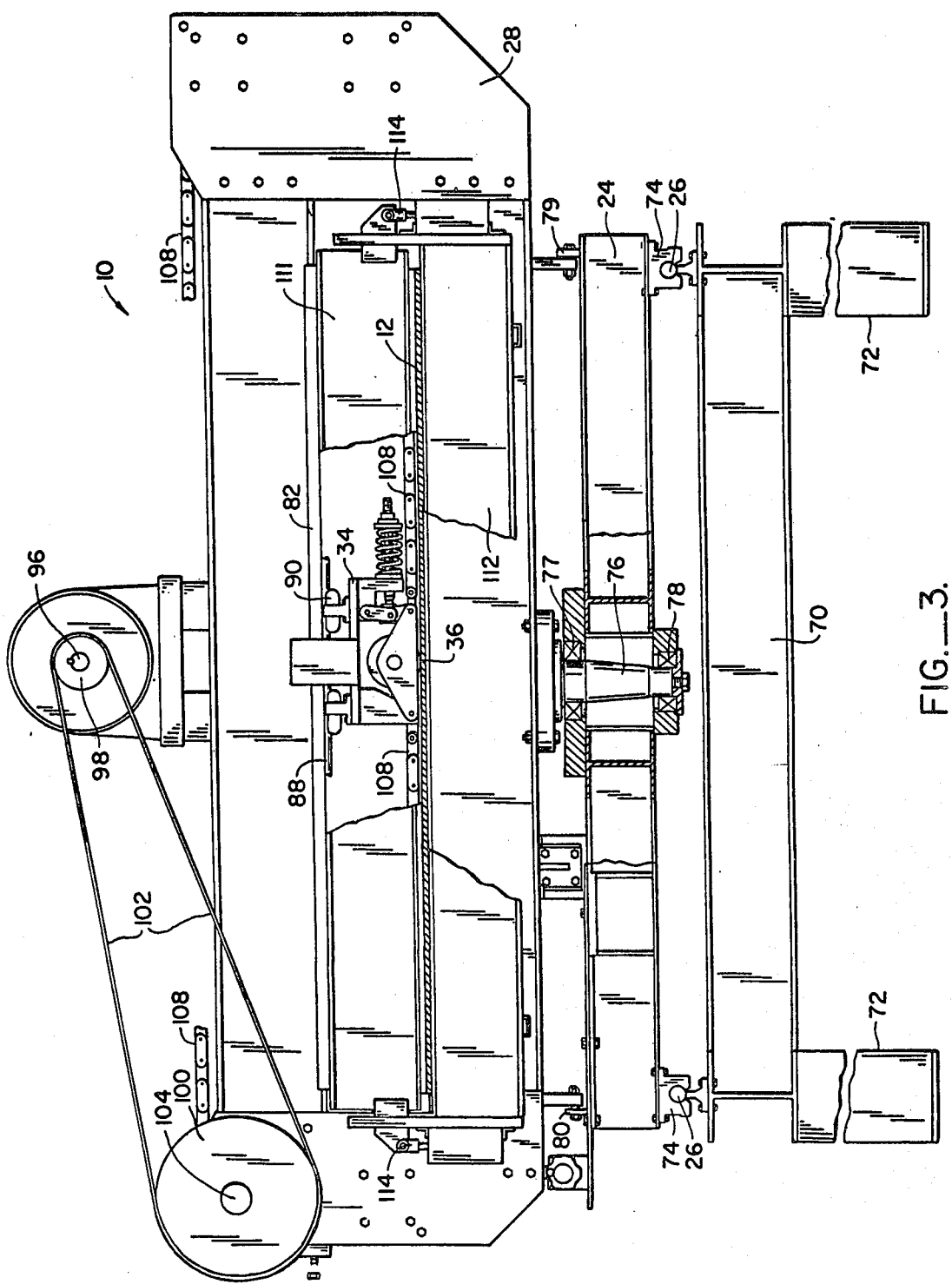
FIG._3.

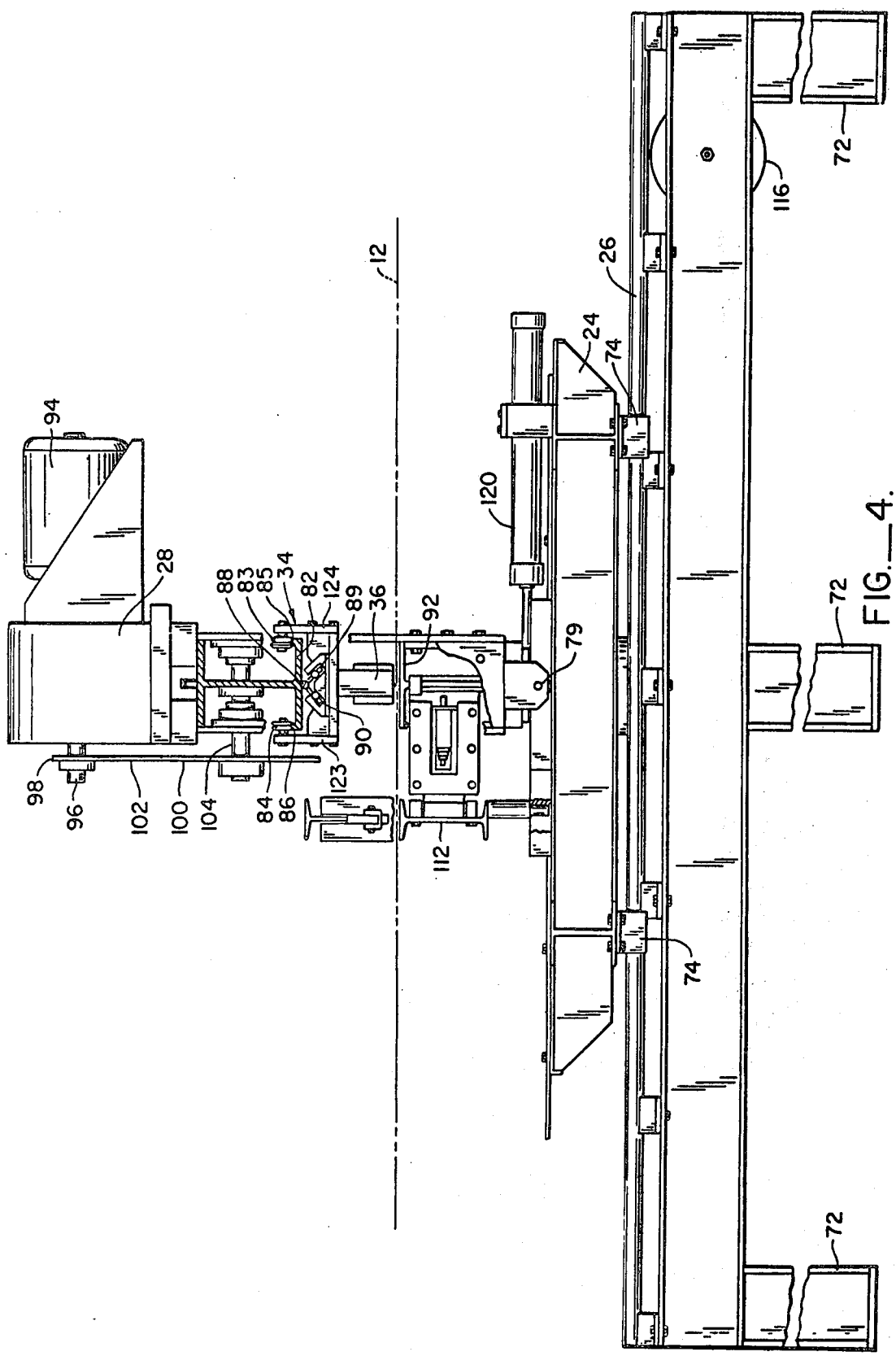
FIG._4.

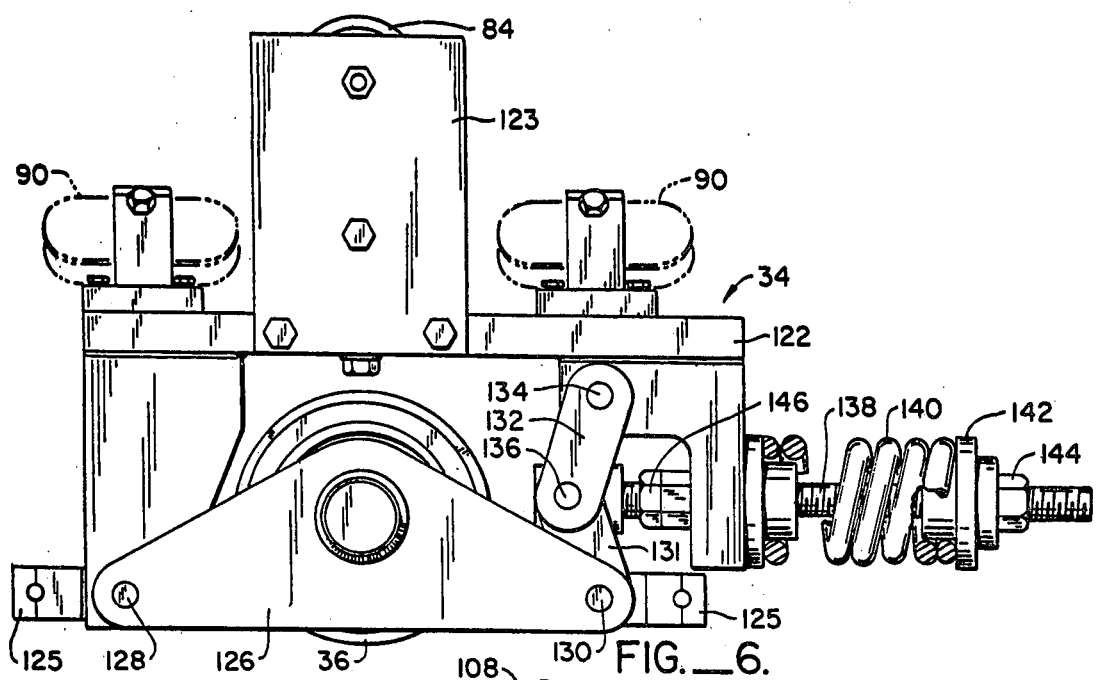
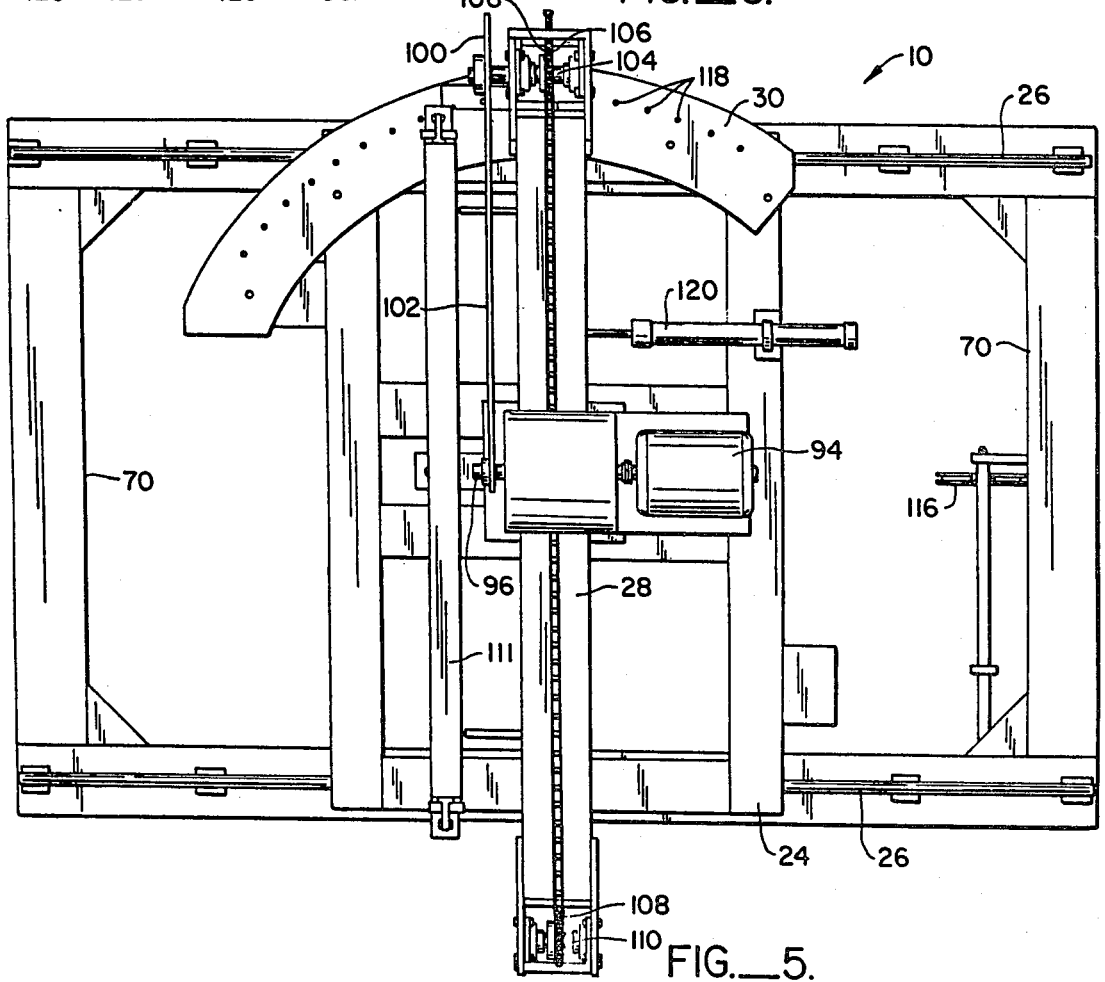

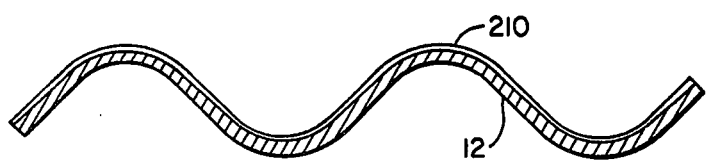
FIG._10.
FIG._9.
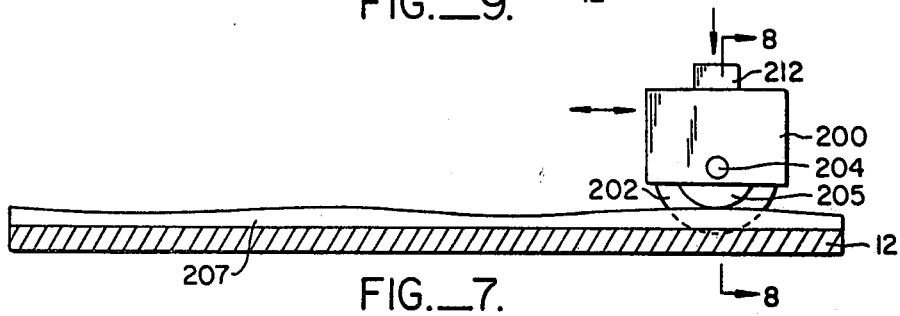
FIG._7.
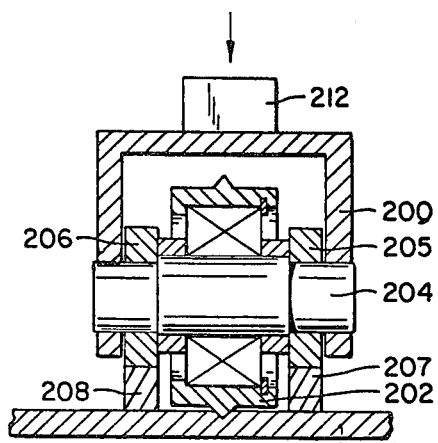
FIG._8.

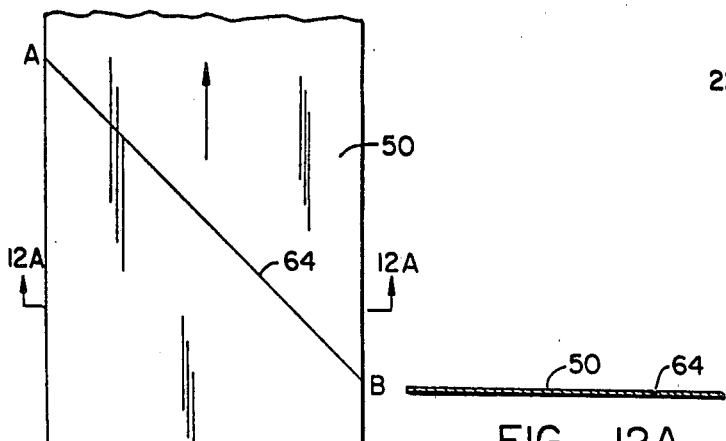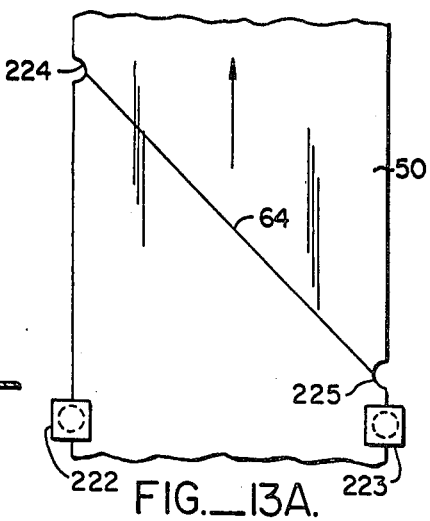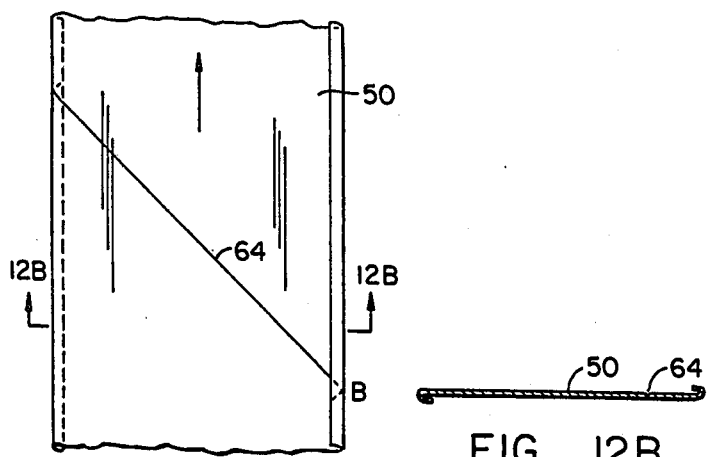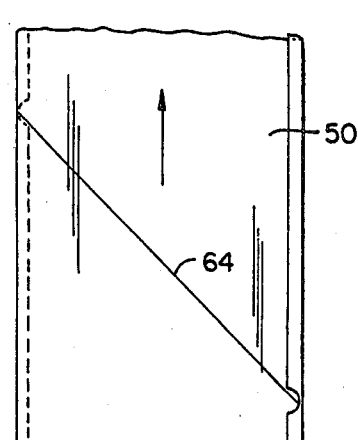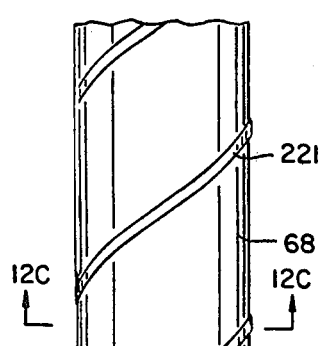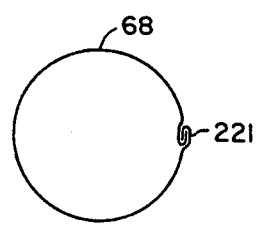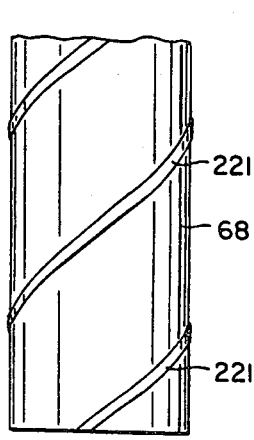

METHOD AND APPARATUS FOR SEVERING CORRUGATED METAL PRODUCTS

This is a division of application Ser. No. 167,942, filed July 14, 1980, now U.S. Pat. No. 4,346,576.

BACKGROUND OF THE INVENTION

The present invention relates to systems for separating a continuous strip of corrugated material into sections, and in particular to preparing the flat sheet material prior to corrugation to facilitate separation of the material into sections after it has been corrugated and/or during the corrugating process.

The use of corrugated structural material, particularly steel, has become quite popular relatively recently in the distinct applications. First, relatively thin gauge sheet material can be corrugated to provide the material with resistance to bending, and used as building panels in various construction applications. Second, a strip of flat sheet material can be corrugated and wound in a helical fashion to form corrugated pipe.

In the formation of corrugating building panels and in the formation of helically wound corrugated pipe, a roll of flat sheet stock is typically used. The flat sheet stock is fed from the roll into a corrugating machine, which forms the flat sheet stock into a continuous strip of corrugated material. In the formation of helically wound corrugated pipe, the strip of corrugated material is wound into the shape of the pipe and the edges are welded or mechanically locked together as with a Pittsburgh lock to form a continuous pipe. These procedures are quite streamlined and efficient, but unfortunately, the efficiency breaks down at the point when the strip of corrugated material is to be separated in the discrete building panels, or the continuous pipe is to be separated into discrete pipe sections.

When building panels are formed in the above described fashion, a continuous strip of corrugated material having a two dimensional profile emanates from the corrugating machine. It is desired that the two dimensional profile be quite deep, and that a substantial portion of the material be located at the extremities of the profile, using steep walls between the extremities, to maximize the bending resistance of the panels.

Shear blades are typically located downstream of the corrugating machine to separate the corrugated material into discrete building panels. For shallow profiles, corresponding shear blades with shallow corrugated edges provide an acceptable cutting tool. However, when the material is to be cut at an angle, such as to accommodate eaves, new shear blades must be provided with a different contour. Each time the contour of the materials change, or the cutting angle is changed, the shear blades must be changed as well. As a result shearing the material becomes a complex and expensive process, and substantially increases the cost of the entire operation.

To shear building panels with shallow corrugated profiles, it is customary to provide shear blades in which one of the blades is inclined from horizontal so that the material is cut from one side to the other in a "scissors" fashion. However, this type of shearing interrupts the continuity of the forming process, which is a particular problem in high speed operations. Moreover, when panels are to be sheared which have deep profiles, and connecting sides at steep angles, it is necessary to use parallel shear blades which instantaneously shear the panel across its entire width. Unfortunately, instantaneous shearing of the entire panel requires massive equipment which is extremely expensive, especially when multiple sets of shear blades must be available.

An obvious solution to the above difficulties would be to cut the sheet stock into sections before it enters the corrugating machine (which requires long runout tables resulting in using more floor space). However, this is generally undesirable because it interrupts the forming operation and reduces the speed of the operation. Also, the quality of the corrugations is diminished at the ends of the corrugated segments because such ends are not restrained as they pass through the corrugating machine, as is the case when a continuous strip of sheet material is being corrugated.

Separating the helically wound continuous corrugated pipe into sections is even more complex. A saw is generally provided on a moving carriage where speed must be precisely matched with the speed of the pipe (see U.S. Pat. Nos. 3,198,043; 3,257,881; 3,369,432). Equipment for sawing the pipe is quite expensive, requires frequent maintenance, and is also noisy. The sawing operation forms an extremely sharp and dangerous edge on the pipe, and it is not uncommon for such pipe to be rejected because of its hazardous edges. The saw also forms burrs on the edge of the pipe, and an additional grinding step must be added, usually at the cost of much hand labor, to remove these burrs and the sharp edge from the end of the pipe.

In the manufacturing of smal items, much smaller than the building panels and pipes discussed above, the technique of scoring the material prior to formimg to facilitate subsequent sectioning is known. A rotating drum having a transverse knife edge is typically located upstream of the forming apparatus, and rotates so that its outer surface moves at the same speed as the material to be formed. When the knife edge contacts the material, it scores it perpendicular to its direction of travel, facilitating subsequent sectioning. However, this technique is not feasible with large pieces of sheet steel such as used in forming building panels and corrugated pipe because of the extremely large forces which would be generated when the knife edge struck the sheet material. Moreover, this technique cannot be adapted to helically wound pipe because the sheet stock must be cut at an angle, and this is difficult if not impossible with a rotating drum system.

SUMMARY OF THE INVENTION

The present invention provides a method and apparatus for use in combination with a machine for corrugating a continuous strip of flat sheet material which prepares the sheet material for separation into sections after it has been corrugated. A platform is located upstream of the corrugating machine. The platform is intermittently advanced in the direction of travel and at the speed of the sheet material so that the platform is stationary relative to the sheet material. A scoring device is located on the platform. The scoring device moves across the width of the sheet material as the platform moves with the sheet material to form a spanwise weak point in the material. After the material passes through the corrugating machine, it can readily be separated into sections at the weak points formed in the materials by the scoring device.

When used in the formation of building panels, the present invention eliminates the necessity for a complex and expensive shearing system downstream of the corrugating machine. Because the sheet material has been previously scored, the corrugated material emanating from the corrugating machine can simply be broken off into the desired sections, either by bending the material or providing a transverse stress at the point where the material is scored.

In the present invention, the scoring system may be adjustable so that the material can be scored at an angle by simply rotating the scoring system. As a result, eave sections and other complex panel shapes are readily formed without additional equipment.

In one embodiment of the present invention, the depth of the score is varied across the width of the material so that the material is scored more deeply at the peaks of the corrugated contour than in the valleys. The material will be held together in the shallowly scored valleys as it undergoes the corrugating process, while the deeply scored peaks will easily separate to facilitate sectioning of the material.

Use of the present invention in pipe forming entirely eliminates the necessity for the saw. The system of the present invention readily scores the material on a preselected bias so that a circumferential score is formed in the pipe. the pipe can easily be separated into sections as it emanates from the roll forming device at the end of the corrugating machine by simply bending the pipe. the pipe separates into sections without burrs or sharp edges at its ends, and grinding of the ends is not required.

Implementation of the system of the present invention in pipe forming gives rise to a special problem not found in the prior art. With the present invention, the flat sheet stock is scored prior to the corrugation of the material and prior to rolling of the corrugated material into the shape of a pipe. The edges of the scored sheet stock are typically folded (lapped) to form a Pittsburgh lock seam and the edges of the score from a slight zig-zag configuration. As a result, when the formed pipe is broken into sections, a sharp wedge protrudes at each end of the pipe at the seam. To overcome the problem, the present invention provides punches upstream of the corrugating machine which cut out semicircles from the sheet stock at the ends of the score so that a protruding wedge does not result. The cutouts also facilitate separation of the material when the ends of the score do not line up precisely after the forming process.

The novel features which are characteristic of the invention, as to organization and method of operation, together with further objects and advantages thereof will be better understood from the following description considered in connection with the accompanied drawings which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a schematic perspective view of the present invention as used in connection with a corrugating machine to form building panels;

FIG. 2 is a schematic perspective view similar to that of FIG. 1 showing the use of the present invention in connection with a corrugating and pipe forming machine to form helically wound corrugated pipe sections;

FIG. 3 is an elevation view of a preferred embodiment of the present invention;

FIG. 4 is a side elevation view of the embodiment of FIG. 3 with certain portions broken away;

FIG. 5 is a top view of the embodiment of FIGS. 3 and 4;

FIG. 6 is an elevation view of the preferred embodiment of the carriage of the present invention;

FIG. 7 is a schematic side sectional view of an alternative embodiment of the present invention in which the depth of scoring varies across the width of the material;

FIG. 8 is a sectional view taken along lines 3-8 of FIG. 7;

FIG. 9 is an elevation view of a score formed by the system of FIGS. 7 and 8 prior to corrugation;

FIG. 10 is a side elevation view of the score formed by the systems of FIGS. 7 and 8 subsequent to corrugation.

FIGS. 11A-C are fragmentary plan views of the sheet stock used to form helically wound corrugated pipe in its flat configuration, after lapping of the edges, and after formation of the pipe respectively without forming cutouts at the ends of the score;

FIGS. 12A-C are section views taken along lines 12A, 12B and 12C of FIGS. 11A-C respectively;

FIGS. 13A-C are similar to FIGS. 11A-C with the inclusion of the cutouts of the present invention.

DESCRIPTION OF THE PREFERRED EMBODIMENTS

A schematic view of the apparatus 10 of the present invention as used in the formation of corrugated structural panels is illustrated by way of reference to FIG. 1. A continuous strip 12 of flat sheet material, usually steel, is fed from supply roll 14. Sheet material 12 is fed through a corrugating machine which includes a sequence of corrugating rollers 16-18 which form the material so that it has a two dimensional profile. A continuous strip of corrugated material 20 emanates from the corrugating machine, and is separated into a plurality of discrete building panels 22.

The system of the present invention provides an apparatus 10 located upstream of corrugating rollers 16-18. Apparatus 10 includes a platform 24 which is moveable in the direction of sheet material 12 on rails 26. A frame 28 spans sheet material 12, and is pivotably mounted to platform 24 at a central pivotal support described hereinafter. Frame 28 is moveable with respect to platform 24 so that the angular position of frame 28 relative to sheet material 12 is adjustable. A track 32 is mounted to frame 28 and spans sheet material 12. A carriage 34 is moveable along track 32, and a scoring roller 36 is mounted to the carriage.

In operation, platform 24 is intermittently advanced along rails 26 at a speed equal to the speed of sheet material 12 so that the platform is stationary relative to the sheet material. While platform 24 is moving coincident with sheet material 12, carriage 34 is propelled along track 32 from one side of the sheet material to the other. Scoring roller 36 scores the material from one side to the other as the carriage tranverses the material, as depicted by dash lines 38. If desired, frame 28 can be rotated so that the score will be at an angle relative to the direction of travel of sheet material 12.

The scored lines 38 in material 12 provide weak points in the material so that the material can easily be separated into sections after it passes through corrugating rollers 16-18. Partial or total separation may also occur during corrugation. One technique for separating the material into sections would be to provide a ram 40 which acts against a support 42 to separate the material at each score 38, and other separating techniques are possible.

The use of the apparatus 10 of the present invention in the formation of helically wound corrugated pipe is illustrated in the schematic view of FIG. 2. A strip 50 of flat sheet material, typically steel, is fed from a roll 52 to a corrugating machine which includes corrugating rollers 54–56. A set of rolls such as 58 bend the corrugated strip 60 emanating from the corrugating machine into a helical configuration, and the edges of the material are welded to form a continuous pipe 62.

Frame 28 is rotated on platform 24 so that scores 64 are formed in the material at an angle to the edge of the material. When the corrugated strip 60 is formed into the continuous pipe 62, scores 64 will provide circumferential scores in the pipe. The free end of the pipe may simply be deflected by a plate 86 to separate the continuous pipe at the score lines 64 to form a plurality of discrete pipe elements 68.

A preferred embodiment of the apparatus 10 of the present invention is illustrated in more detail by reference to FIGS. 3–5 in combination. Rails 26 are mounted to a base 70 which is supported by legs 72. Platform 24 includes bushings 74 which ride on rails 26 so that the platform is moveable in the direction of travel of the strip 12 of sheet material.

A spindle 76 is bolted to the bottom of frame 28. Spindle 76 projects downwardly through platform 24, and is confined by bearings 77, 78 so that frame 28 is pivotable about a fixed vertical axis. Small wheels 79, 80 depend from frame 28 and rest on the upper surface of platform 24.

A transverse track 82 spans frame 28 above the strip 12 of sheet material. Carriage 34 is suspended from track 82 on rollers 83, 84 which ride along ridges 85, 86 on the track. A rod 88 runs along the underside of track 82, and carriage 34 includes a pair of bearings 89, 90 which bear against rod 88 and prevent upward movement of the carriage.

Scoring wheel 36 depends from carriage 34, as will be illustrated in more detail hereinafter. Plate 92 underlies sheet material 12 to provide a support surface for the sheet material during the scoring operation.

Motor 94 is mounted to frame 28, and has an output shaft 96 with a drive pulley 98. Drive pulley 98 is connected to a larger reduction pulley 100 by belt 102. Reduction pulley 100 is mounted on a shaft 104 containing a chain sprocket 106. Chain 108 is connected at its ends to carriage 34 (see FIG. 3) and circumscribes sprocket 106 and a corresponding sprocket 110 at the opposite side of frame 28 (FIG. 5) together with other idler sprockets not shown. Chain 100 provides a positive drive system for carriage 34 so that it can be propelled back and forth across sheet material 12.

Parallel beams 111, 112 span sheet material 12 above and below the sheet material. Bottom beam 112 is fastened to frame 28, and top beam 111 is connected to actuators 114 so that it is moveable in a vertical direction. When a score is to be formed in sheet material 12, actuators 114 clamp beams 111, 112 together with the sheet material 12 therebetween, attaching apparatus 12 to the sheet material. Accordingly, platform 24 is propelled along rails 26 at the speed of the sheet material so that the platform is stationary relative to the material as the scoring is accomplished. After the scoring has been finished, actuators 114 are released and a spring loaded take-up real 116 draws platform 24 back along rails 26 to place it in position for the next cycle.

The angular position of frame 28 can be fixed by locating a peg from the frame into one of a plurality of apertures 118 on circular support 30. In addition, the system can be automated to rotate frame 24 to preselected discrete angular positions using actuator 120. Actuator 120 may be useful in cutting of building panels in which one end of the panel is to be square, while the other end is cut at an angle to accommodate an eave section or for some other purpose.

The preferred embodiment of a carriage 34 of the present invention is illustrated by way of reference to FIG. 6. Carriage 34 includes a body 122, with legs 123, 124 on which wheels 84, 83 are mounted. Attachment points 125 are provided on body 122 for attachment to drive chain 108 (not shown in FIG. 6).

A yoke 126 is attached at its forward end to carriage body 122 by a pin connector 128, which allows yoke 126 to pivot about a horizontal axis. The trailing end of yoke 126 is mounted by a pin connector 130 to one of a pair of links 131, 132. Link 132 is connected to carriage frame 122 by pin connector 134, and links 131, 132 are connected to one another by pin connector 136.

Links 131, 132 operate on a toggle principle so that a slight pivoting of yoke 126 about connector 128 causes movement of pin connector 136 which is proportionate to but much greater than the trailing end of yoke 126 at pin connector 130. A shaft 138 is connected to pin connector 136, and projects outwardly through an aperture provided in carriage body 122. A coil spring 140 circumscribes shaft 138 and a stop 142 confines spring 140 between the stop and carriage body 122. A nut 144 can be used to adjust the tension on spring 140. Another nut 146 is threadibly engaged with shaft 138 and prevents full expansion of spring 140.

Scoring roller 36 is mounted to yoke 126. As carriage 34 is propelled across the sheet material, scoring roller 36 is forced upwardly, pivoting yoke 126 in a counter-clockwise direction (referring to FIG. 6). Such movement of yoke 126 compresses spring 140, which acts to bias scoring roller 36 downwardly. The position of nut 44 is adjusted to control the force of the scoring roller on the sheet material.

An alternate embodiment of the present invention is illustrated by way of reference to FIGS. 7 and 8. In this embodiment, a carriage 200 supports a scoring roller surface 202 on a shaft 204. Shaft 204 includes a pair of cam following rollers 205, 206. Each cam following roller 205, 206 rides along parallel linear cams 207, 208 resting on top of sheet material 12. A biasing mechanism 212 such as a hydraulic cylinder maintains followers 205, 206 in contact with cams 208, 208. Each cam 207, 208 has a contoured upper cam surface so that a contoured groove 210 is formed in sheet material 12, as illustrated in FIG. 9. Alternatively, the biasing mechanism 212 can be controlled in a variable fashion to vary the depth of the score in a preselected fashion even without the use of cams and followers.

The contour of groove 210 is preselected so that the deep part of the groove occurs at the peaks of the corrugated sections, as illustrated in FIG. 10, with the shallow portions of the groove occurring in the valleys. In this fashion, the relatively shallowly scored valleys of the material will tend to keep the material in one piece as it passes through the corrugating operation. The deeply scored peaks are more susceptible to separation during corrugation. After the material has passed through the corrugating process, it can be bent downwardly to readily separate the material into sections.

A fragmentary plan view of sheet material 50 used in the formation of a helically wound corrugated pipe is illustrated in FIG. 11A. As material 50 passes through the apparatus of the present invention, the plurality of transverse scores 64 are formed at an angle to the edge of the material from point A to point B, as previously illustrated in FIG. 2. However, it has been found that when the edges of the material are lapped as part of the forming process, as illustrated in FIGS. 11B and 12B, the score forms a zigzag pattern at its ends. As a result, when material 50 is formed into a pipe configuration with seam 221 formed with a Pittsburgh lock (FIG. 11C, 12C) and broken off into sections such as 68, a protruding wedge 220 is formed at each edge of each pipe section at the seam.

In order to eliminate the unwanted protruding edge 220, a pair of punches 222, 223 may be located along the edges of sheet material 50, as illustrated in FIG. 13A. Punches 222, 223 are activated to punch semicircular cutouts 224, 225 in material 50 at the opposite ends of score 64. The depth of cutouts 224, 225 is at least equal to the distance to which the edges of material 50 is lapped so that lapping of the material as illustrated in FIG. 13B does not result in a double thickness at the edges of scores 64. Accordingly, when the material is formed into a pipe section 68, no protruding wedge exists at seam 221 at the ends of the section.

In operation, the system of the present invention can readily be implemented in an existing production line for helically wound corrugated pipe. In this applicaion, the system of the present invention scores the material prior to corrugating, providing for ready separation of the formed material into separate pipe elements, eliminating the need for a saw. In the formation of building panels, the panels can readily be obtained from a continuous strip of sheet material, and shearing difficulties are eliminated.

While preferred embodiment of the present invention have been illustrated in detail, it is apparent that modifications and adaptations of those embodiments will occur to those skilled in the art. For example, the preferred embodiments disclose scoring procedures in which a continuous groove is formed, but the score need not be continuous. It is to be expressly understood that such modifications and adaptions are within the spirit and scope of the present invention, as set forth in the following claims:

What is claimed is:

1. A method for producing from flat metal sheet a corrugated product having a predetermined length comprising the steps of: feeding an elongated flat metal sheet in a longitudinal direction of the sheet towards a corrugator; forming a score line in the flat metal sheet across a width thereof, the score line extending from one face towards another, opposite face of the sheet; thereafter passing the sheet through the corrugator to transform the sheet into a corrugated plate having longitudinally extending, parallel side-by-side corrugations; and severing the corrugated project from the corrugated plate by applying a force to the plate in a direction transverse to a surface of the plate, the force being applied in the vicinity of the score line; whereby the product snaps off a remainder of the corrugated plate along the score line.

2. A method according to claim 1 including the step of helically coiling the corrugated plate about an axis to form a substantially cylindrical, corrugated pipe; wherein the step of forming the score line includes the step of angularly inclining the score line relative to the travel direction of the flat sheet so that upon helically coiling the corrugated plate the score line has a substantially circular configuration; and wherein the step of severing is performed after the step of helically coiling; whereby the product comprises a length of corrugated pipe.

3. A method according to claim 1 wherein the corrugations are defined by alternating corrugation peaks and corrugation troughs joined by intermediate corrugation sides, and wherein the step of forming the score line comprises the step of varying the depth of the score line so that it is relatively deeper at the corrugation peaks than at the corrugation troughs.

4. A method according to claim 1 wherein the step of forming a score line comprises the steps of providing a platform at a point upstream of the corrugator in substantially overlying relationship to the sheet; intermittently advancing a platform in the direction of travel of and at substantially the same speed as the sheet so that the platform is stationary relative to said material; propelling a carriage along a track mounted to the platform across the width of the sheet material; and scoring the sheet material across its width from one edge to the other with a scoring mechanism located on the carriage to form the score line.

5. A method according to claim 4 wherein the advancing step includes the step of clamping the platform to the sheet so that the platform is advanced at substantially the same speed as the sheet.

6. A method according to claim 4 wherein the scoring step includes the step of rolling a scoring roller attached to the carriage across the width of the sheet.

7. A method according to claim 4 and additionally comprising the steps of returning the platform to its original position after each said advancing step.

8. A method according to claim 4 including the step of changing the angular position of the track relative to the direction of travel of the sheet.

9. A method according to claim 8 including the step of automatically repositioning the angular position of the track after each scoring step.

10. A method for forming discrete lengths of corrugated metal plate from a relatively long, flat metal sheet comprising the steps of: moving the metal sheet in a longitudinal direction; forming a score line extending transversely across a width of the sheet and from one face towards another, opposite face of the sheet; thereafter passing the sheet through a corrugator to transform the sheet into a corrugated plate having longitudinally extending, parallel, side-by-side ocrrugations; and thereafter severing the length of corrugated plate from a remainder of the corrugated plate by applying a force to the corrugated plate in the vicinity of the score line which acts transversely to the faces of the sheet so that the applied force snaps off the length of corrugated plate from a remainder thereof along the score line.

11. A method according to claim 10 wherein the step of applying the force comprises the step of applying the force over a substantial portion of the width of the corrugated plate substantially parallel to the scrore line.

12. A method according to claim 10 wherein the step of forming the score line comprises the step of varying the depth of the score line so that it is relatively deeper at some portions of the corrugated plate than at other portions thereof.

13. A method for forming finite lengths of corrugated pipe from flat metal sheet comprising the steps of: moving the sheet in a longitudinal direction; forming a score line across a width of the sheet and extending from one face towards another face of the sheet, the score line being angularly inclined with respect to the direction of movement of the sheet; thereafter corrugating a plurality of longitudinally extending, parallel, side-by-side corrugations in the sheet by passing the flat sheet through a corrugator to thereby transform the sheet into an elongated, corrugated plate; helically coiling the corrugated plate about an axis in a coiling device into a substantially cylindrical corrugated pipe which issues from the device; the step of forming the score line including the step of setting the angularity thereof so that the score line has a substantially circular configuration on the pipe; and severing the finite length of corrugated pipe from a remainder of the pipe by applying a force in the vicinity of the circular score line which acts transversely to the pipe axis; whereby the length of the pipe snaps off the remainder of the pipe along the score line.

14. A method according to claim 13 wherein the step of helically coiling comprising the steps of helically coiling pipes of differing diameters, and wherein the step of setting includes the step of adjusting the angularity of the score line relative to the direction of travel of the flat metal sheet so that for each pipe diameter the score line on the pipe is substantially circular.

* * * * *